United States Patent Office 3,430,743
Patented Mar. 4, 1969

3,430,743
VISCOUS OIL FLOW HYDRAULIC COUPLING
Saburo Fujita and Uichiro Kobashi, both of Kariya, Japan, assignors to Aisin Seiki Kabushiki Kaisha, Kariya, Aichi Prefecture, Japan
Filed July 27, 1967, Ser. No. 656,589
Claims priority, application Japan, Aug. 3, 1966, 41/51,186
U.S. Cl. 192—58
Int. Cl. F16d 31/00, 21/02; F01p 7/02
4 Claims

ABSTRACT OF THE DISCLOSURE

This invention relates to a viscous oil flow hydraulic coupling so designed that two different kinds of output can be obtained from a single input.

---

The invention is applicable to means for driving any auxiliary machinery, such as cooling fan, water pump, car cooler, etc., in a motor vehicle. Owing to the recent development of auxiliary machinery for a motor vehicle, the conventional engine cooling radiator system has to be put under heavier duty during the idling, and during low speed running of the vehicle under high load, the duty on the engine cooling system is becoming heavier and even heavier than that required for the highest speed running of the vehicle. To cope with the above mentioned difficulty it has been heretofore proposed to employ a radiator fan of large capacity driven by a viscous oil flow hydraulic coupling. For the purpose, however, it will be also required to employ a water pump having larger delivery capacity at low number of rotation in order to get greater cooling effect at low speed, whereby at high speed of rotation the delivery capacity will have to be increased over that normally required, so that it would be liable that the cooling water circulatory system is subject to higher water pressure. This would not be desirable with respect to the motor vehicle engine.

In view of the above, according to the present invention, the viscous oil flow hydraulic coupling is so designed that two kinds of output may be obtained as derived from a single input. Thus, the principal object of the present invention is to provide a new viscous oil flow hydraulic coupling, whereby large capacity of the circulating cooling water can be obtained even at low speed running, whereas at high speed zone it is suppressed at predetermined degree, and also it is possible to desirably control the cooling air too. Other objects of the present invention will become apparent from the following detailed description taken in conjunction with the accompanying drawings wherein:

Figure 1:
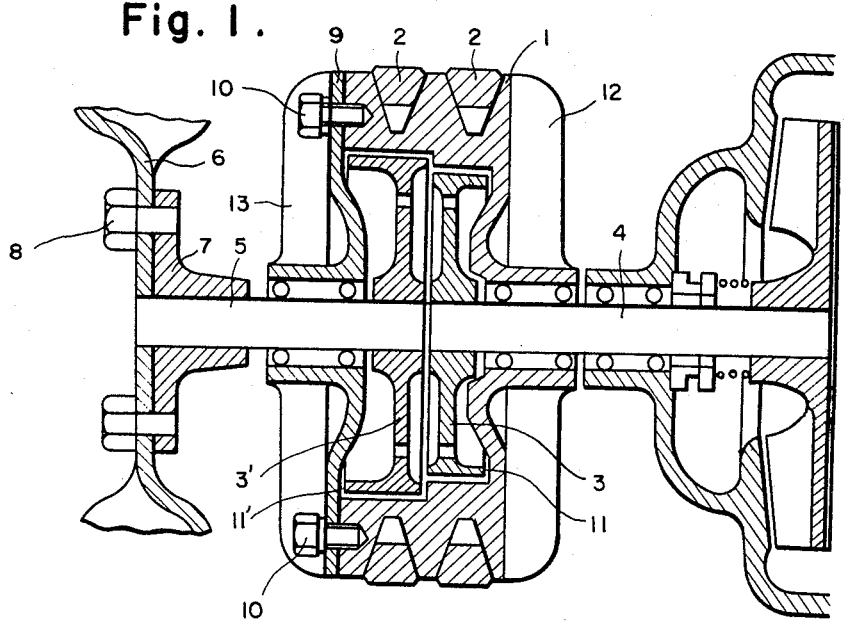
FIGURE 1 is a longitudinal section of a hydraulic coupling forming an embodiment of the present invention.

Referring to the drawing, a liquid sealed housing 1 of the coupling driven by driving belts 2 is enclosing two driven discs 3 and 3' which are arranged vis-a-vis. The disc 3 is mounted on a shaft 4 of a water pump (not shown), whilst the other disc 3' is mounted on a shaft 5 of a cooling fan 6 having its boss 7 secured by means of screw bolts 8. 9 is a cover plate secured to the housing 1 by means of screw bolts 10, making liquid tight seal. Between the outer faces of the discs 3, 3' and the inner wall of the housing 1, there are small axial clearances 11 and 11', which are filled with oil having high viscosity, thereby making a driving connection of the housing 1 with the discs 3, 3' mounted to the shafts 4, 5, respectively. 12 and 13 are aero-fins provided on the housing 1 for preventing rise of temperature thereof.

Figure 2:
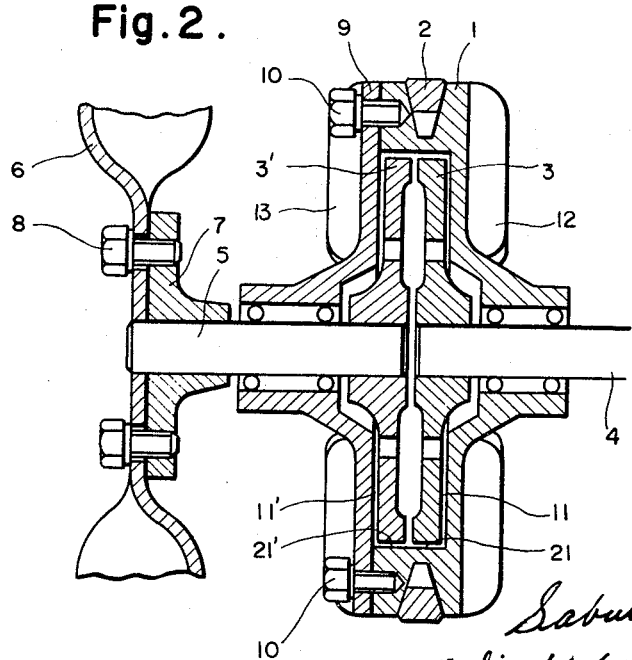
FIGURE 2 is a similar view showing a modified form of the hydraulic coupling of this invention.

When the coupling housing 1 is rotated as driven by the belts 2, the discs 3 and 3' are rotated by shearing stress of the viscous oil in the clearances 11, 11'. Assuming that the dimensions of the clearances 11 and 11' are equal, and that the discs 3 and 3' are of same diameter, the outlet torque produced on the discs 3 and 3' are of the same value, whereas it would be able to differentiate the outlet torque produced on the disc 3 and the outlet torque produced on the disc 3' by making a difference of dimension of the clearances 11 and 11' or by making difference of diameter of the discs 3 and 3'. In the embodiment of the present invention shown in FIG. 2, wherein same reference numerals designate the same or equivalent parts, the discs 3 and 3' are of the same diameter, and the dimension of the clearances 11 and 11' are same too, so that it will be seen that the outlet torque produced on the discs 3 and 3' would be of same value. In FIG. 2 wherein the driven discs 3 and 3' are of the same diameter, the axial clearances 11 and 11' are of the same dimension, and the radial clearances 21 and 21' are also of the same dimension, it will be understood that the number of r.p.m. of the driven discs 3 and 3' are different, depending upon the load on the shafts 4 and 5, respectively.

In the embodiments of the present invention shown in the drawing as applied to the cooling fan and the water pump for a motor vehicle, in which a plurality of driven discs are enclosed in one housing 1 forming a single driver, it will be seen that any relative torque for driving the cooling fan and the water pump may be obtained by appropriately determining the diameter of the driven discs 3 and 3' and the dimension of the axial clearances 11 and 11' and of the radial clearances 21 and 21' between the periphery of the discs 3 and 3' and the inner wall of the housing to comform to the required condition, thereby obtaining good cooling effect with least power consumption and silent operation of the machinery.

Whilst in the above the present invention has been described with reference to driving of the cooling fan and the water pump of the motor vehicle, it is to be understood that this invention is also applicable to any other machinery which is equipped with two parts to be driven at different highest speed with required torque.

What we claim is:

1. A viscous oil flow hydraulic coupling, comprising a liquid tight housing adapted to be driven from a source of power, two driven discs arranged vis-a-vis end enclosed in said housing, and two shafts to which said driven discs are securely mounted respectively, the arrangement being such that axial clearances and radial clearances are left between the outer faces of said driven discs and the inner wall of the housing and between the periphery of said driven discs and the inner wall of the housing, respectively.

2. A hydraulic coupling as recited in claim 1, wherein the two driven discs enclosed in the housing are of different diameter.

3. A hydraulic coupling as recited in claim 1, wherein the axial clearance between one of the driven disc and the inner wall of the housing is of different dimension compared with the dimension of the axial clearance between the other driven disc and the inner wall of the housing.

4. A hydraulic coupling as recited in claim 1, wherein the radial clearance between the periphery of one of the driven disc and the inner wall of the housing is of different dimension compared with the dimension of the radial clearance between the periphery of the other driven disc and the inner wall of the housing.

(References on following page)

References Cited

UNITED STATES PATENTS

| | | | |
|---|---|---|---|
| Re. 24,157 | 5/1956 | Johnson | 60—54 XR |
| 2,080,279 | 5/1937 | Kellogg. | |
| 2,342,414 | 2/1944 | Magill. | |
| 2,557,799 | 6/1951 | Salmivuori. | |

CARLTON R. CROYLE, *Primary Examiner.*

A. D. HERRMANN, *Assistant Examiner.*

U.S. Cl. X.R.

192—48.8; 123—41.11